United States Patent [19]

Hamanishi

[11] 4,452,513
[45] Jun. 5, 1984

[54] ZOOM LENS CAPABLE OF CLOSE RANGE PHOTOGRAPHY AND METHOD OF FOCUSING THE SAME TO A SHORT DISTANCE

[75] Inventor: Yoshinari Hamanishi, Tokyo, Japan
[73] Assignee: Nippon Kogaku K.K., Tokyo, Japan
[21] Appl. No.: 387,677
[22] Filed: Jun. 11, 1982
[30] Foreign Application Priority Data
  Jun. 19, 1981 [JP] Japan ................. 56-93728
[51] Int. Cl.³ ........................................ G02B 15/10
[52] U.S. Cl. ....................... 350/428; 350/423
[58] Field of Search ........... 350/428, 430, 423, 427

[56] References Cited
U.S. PATENT DOCUMENTS
  3,884,555 5/1975 Suwa et al. .................. 350/428
  4,240,699 4/1980 Sato et al. ................... 350/184

*Primary Examiner*—John K. Corbin
*Assistant Examiner*—Paul M. Dzierzynski
*Attorney, Agent, or Firm*—Shapiro and Shapiro

[57] ABSTRACT

A zoom lens has, in succession from the object side, a first lens group as a convergent focusing group, a second lens group as a divergent magnification changing group, a third lens group as a convergent correcting group, and a fourth lens group as a convergent relay system. The second group and the third group are movable relative to each other along the optical axis to thereby change the magnification while keeping the image plane at a predetermined position. During focusing to objects from infinity to a predetermined short distance, the first group is moved toward the object side and during focusing to an object at a distance still shorter than said predetermined short distance, the first group and the second group are moved along the optical axis at the same time while the third group is maintained at a predetermined position from the image plane.

10 Claims, 51 Drawing Figures

ZOOM LENS CAPABLE OF CLOSE RANGE PHOTOGRAPHY AND METHOD OF FOCUSING THE SAME TO A SHORT DISTANCE

BACKGROUND OF THE INVENTION

1. Field of the Invention

This invention relates to a zoom lens which can be continuously focused to objects from infinity to a very short distance.

2. Description of the Prior Art

Generally, photographic lenses are designed with infinity object distance as the standard and therefore, when they are focused to a short distance object, their imaging performance is usually aggravated. Particularly, in zoom lenses, various focusing methods for short distance photography have been proposed to enhance their multi-function, but the deterioration of their imaging performance at short distances is substantial and therefore, even in a lens having a good imaging performance for infinity object distance, aggravation of various aberrations is substantial during photographing of short distance objects and thus, such a lens has not been practical unless it is stopped down considerably. Also, a zoom lens is basically much more bulky in construction than a fixed focus lens having the same focal length as the focal length on the wide side. To enable the zoom lens to be focused to a considerably short distance only by a first group thereof, the aperture of the first group must be made larger and this makes it necessary to give sufficient consideration to the compactness of the lens shape. If the aperture of the lens is made small, the quantity of marginal light is liable to become deficient particularly at short distances and, if the full length of the lens and the focal length of the first group are made short, correction of various aberrations will become difficult and therefore, it has been very difficult to maintain good imaging performance for short distances while keeping the shape of the entire lens system compact.

SUMMARY OF THE INVENTION

It is an object of the present invention to provide a zoom lens which can be continuously focused to objects from infinity to a very short distance and which is compact and moreover excellent in imaging performance for short distances.

The invention will become fully apparent from the following detailed description thereof taken in conjunction with the accompanying drawings.

DESCRIPTION OF THE PREFERRED EMBODIMENTS

Figure 1:
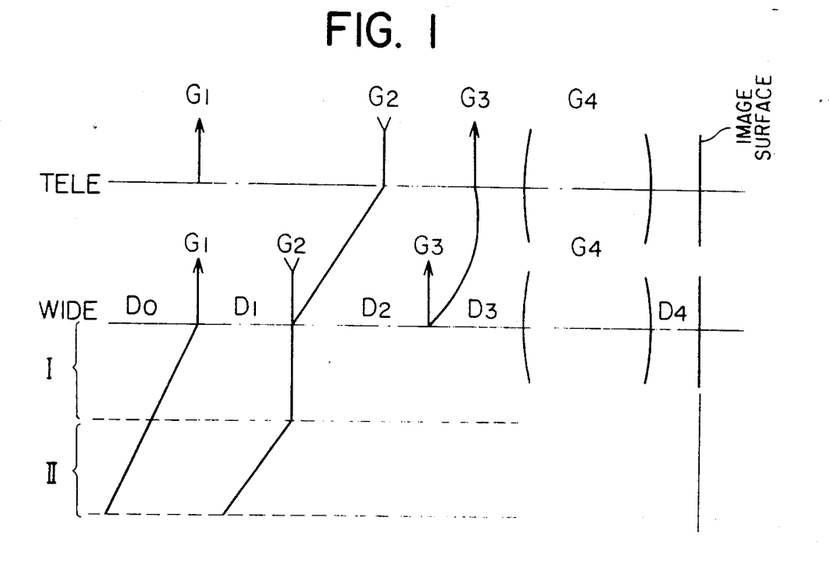
FIG. 1 shows an example of the locus of movement of a second lens group and a third lens group for magnification change and an example of the locus of movement of a first lens group and the second group for focusing.

The zoom lens according to the present invention is a zoom lens which, as shown in FIG. 1, has, in succession from the object side, a first lens group $G_1$ as a convergent focusing group, a second lens group $G_2$ as a divergent magnification changing group, a third lens group $G_3$ as a convergent correcting group, and a convergent fourth lens group $G_4$ as a relay system and in which the second group $G_2$ and the third group $G_3$ are movable relative to each other along the optical axis to thereby effect magnification change while keeping the image plane at a predetermined position and wherein focusing to objects at distances between infinity and a predetermined short distance is accomplished by movement of only the first group $G_1$ toward the object side and focusing to an object at a distance shorter than said predetermined short distance is accomplished by moving the first group $G_1$ and the second group $G_2$ at the same time along the optical axis while maintaining the third group at a predetermined position relative to the image plane.

Specifically, in the above-described so-called four-group afocal zoom lens wherein focusing in the entire magnification change range can be accomplished by movement of the first group, when an object at a very short distance is to be photographed, the second group $G_2$ and the third group $G_3$ are first moved to or near the shortest focal length condition (wide end). For objects up to a predetermined short distance, the first group $G_1$ is singly moved toward the object side by a predetermined amount to thereby accomplish focusing, and then in addition to the further movement of the first group $G_1$ toward the object side, the second group $G_2$ is also moved toward the object side to thereby accomplish focusing to an object at a distance shorter than the predetermined short distance. The focusing by solo movement of the first group $G_1$ will hereinafter be referred to as the first focusing, and the focusing by the first group $G_1$ and the second group $G_2$ will hereinafter be referred to as the second focusing.

FIG. 1 shows an example of the locus of movement of the second group $G_2$ and the third group $G_3$ for magnification change and an example of the locus of movement of the first group $G_1$ and the second group $G_2$ for focusing. In the figure, the area I shows the condition of the first focusing, and the area II shows the condition of the second focusing.

In the first focusing by solo movement of the first group, as the distance changes from infinity to the short distance, spherical aberration, astigmatism and curvature of image field all move in the negative sense and become greater. When the distance becomes shorter than a certain distance, the tendencies of astigmatism and curvature of image field are reversed and both of them change to the positive sense while spherical aberration gradually and monotonously increases still in the negative sense. In contrast, if the second group is singly moved toward the object side, astigmatism and curvature of image field will both be created greatly in the negative sense. Accordingly, the tendencies of astigmatism and curvature of image field are reversed by the first focusing, and up to a position whereat they return to the order of the values of aberration before the first group is axially moved or a position whereat they assume values slightly positive therefrom, the first group $G_1$ alone is moved and when focusing is to be effected to a distance shorter than this, the second focusing in which the second group $G_2$ is also moved is adopted, whereby focusing up to a very short distance can be accomplished without aggravating astigmatism and curvature of image field. It has been found that, according to this second focusing, spherical aberration does not vary so much and the aggravation of the various aberrations can be minimized.

In addition to such an advantage of aberration correction, the construction of the present invention is advantageous in preventing the deficiency of the quantity of marginal light which is liable to occur during short distance photography. According to the first focusing in which focusing is accomplished by movement of the convergent first group toward the object side, the position at which a light ray of wide angle of view is incident on the first group gradually becomes more distant from the optical axis and at least deviated from the effective diameter of the first group, so that deficiency of quantity of light is caused in the marginal portion of the image. Therefore, in the case of the first focusing which has heretofore been usually practised, it is necessary to increase the lens aperture to prevent the deficiency of the quantity of marginal light. To keep the lens aperture small, it has been necessary to sacrifice the quantity of marginal light, or to confine the focusing distance to a certain long distance range, or to reduce the focal length of the first group. In contrast, in the present invention, the refractive power of the first group is suitably increased and the second focusing in which the divergent second group in addition to the first group is moved toward the object side is effected, whereby the position at which a light ray of wide angle of view at the short distance is incident on the first group can be kept at a relatively short distance from the optical axis with the result that decrease in quantity of marginal light is prevented while the lens aperture of the first group is kept as small as possible, thereby enabling very close range photography having a good imaging performance.

Figure 2:
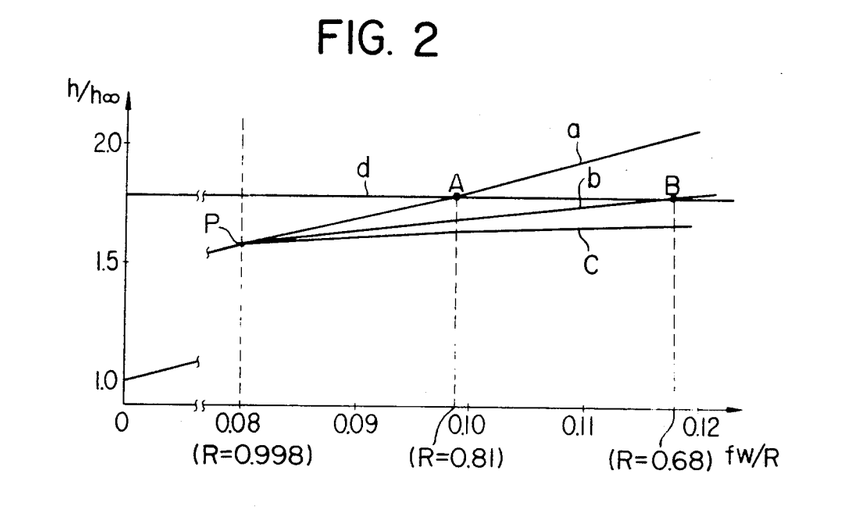
FIG. 2 illustrates the relation between the object distance and the height of the principal ray incident on the first group in a first embodiment.

Such compactness of the effective diameter of the first group according to the present invention will be explained with respect to a first embodiment which will hereinafter be described. FIG. 2 shows a comparison between various focusing systems with respect to how the incidence height of the principal ray incident on the first group is varied by a variation in the object distance in the first embodiment (focal length $f=80-200$ mm, F-number 4.0).

In FIG. 2, the vertical axis represents the incidence height of the principal ray of a maximum angle of view incident on the first group, the incidence height being expressed as a value standardized by the incidence height $h\infty$ in the condition focused to an infinity object. The horizontal axis represents the shortness of the object distance, which is expressed as the value of the ratio of the shortest focal length $fw$ of the entire system to the object distance R.

In the second focusing, the variation in the principal point spacing between the first group and the second group is $\Delta D_1$ and the variation in the principal point spacing between the second group and the third group is $\Delta D_2$ and if the moving of the first group and the second group for the second focusing is expressed by the value of the ratio $\Delta D_1/\Delta D_2$, $\Delta D_1/\Delta D_2=\infty$ when the amount of movement of the second group toward the object side is zero, $\Delta D_1/\Delta D_2=1$ when the amount of movement of the second group is equal to the amount of movement of the first group, and $\Delta D_1/\Delta D_2=0$ when the amount of movement of the first group relative to the second group is zero. Thus, the specific condition of the second focusing can be expressed by the value of $\Delta D_1/\Delta D_2$ and in FIG. 2, curve a shows the variation when $\Delta D_1/\Delta D_2=\infty$, curve b shows the variation when $\Delta D_1/\Delta D_2=1$ and curve c shows the variation when $\Delta D_1/\Delta D_2=0$. In the figure, straight line d shows the incidence position of the marginal ray from the infinity object on the axis and represents the magnitude of the minimum aperture of the first group necessary to maintain predetermined brightness of the lens system.

As can be seen from FIG. 2, when the second group is not moved at all and focusing is effected only by the first group (curve a), the incidence height of the principal ray becomes sharply greater as the object distance becomes shorter and, in order that focusing may be effected to an object at a distance shorter than the point of intersection A with the straight line d in FIG. 2, the aperture of the first group must be larger than the size necessary to maintain the predetermined brightness. If the aperture is not made larger, a decrease in quantity of marginal light and vignetting will occur. Accordingly, when the second group is not moved, only the focusing up to the object distance $R=0.81$ m corresponding to the point A can be sufficiently accomplished. In contrast, in the case of the second focusing (curve b) in which the second group in addition to the first group is moved relative to an object at a distance shorter than a predetermined object distance ($R=1$ m) represented by a point P in the figure so that $\Delta D_1/\Delta D_2 = 1$, sufficient focusing is possible up to R=0.68 m corresponding to a point B in the figure without the aperture being made larger. It will also be seen that in the case of $\Delta D_1/\Delta D_2 = 0$ (curve c), focusing can be accomplished up to a still shorter distance while minimizing the lens aperture.

According to the present invention, as described above, focusing up to a shorter distance is possible while keeping the lens aperture of the first group at a necessary minimum, but in order that the aforementioned correction of the fluctuations of the various aberrations may be well accomplished, it is desirable that the following conditions be satisfied:

$$-1.0 < \frac{\Delta D_1}{\Delta D_2} < 2.0 \quad (1)$$

$$0.5 < \frac{fw}{f_1} < 0.8 \quad (2)$$

$$0.5 < \frac{D_2 \cdot \gamma}{fw} < 1.5 \quad (3)$$

where $\Delta D_1$: the amount of variation in the principal point spacing between the first group and the second group $\Delta D_2$: the amount of variation in the principal point spacing between the second group and the third group fw: the shortest focal length of the entire system $f_1$: the focal length of the first group $D_2$: the principal point spacing between the second group and the third group during infinite-focus in the shortest focal length condition $\gamma$: zoom ratio Each of the above conditions will hereinafter be described.

Condition (1) prescribes the optimum range of amount of movement of the first and second groups during very close range photography.

If the upper limit of condition (1) is exceeded, the principal ray at the maximum angle of view will become far off from the optical axis and aperture eclipse will occur and deficiency of quantity of marginal light will be liable to occur and, if an attempt is made to secure the quantity of marginal light, the lens aperture of the first group will become quite large. On the other hand, if the lower limit of this condition is exceeded, astigmatism and curvature of image field will be excessively created in the negative sense and thus, the imaging performance will be remarkably deteriorated.

Condition (2) is the ratio of the refractive power of the first group to the refractive power of the entire system in the shortest focal length condition and prescribes the refractive power to be borne by the first group.

If the upper limit of condition (2) is exceeded, the refractive power of the first group will become great and therefore it wil become difficult to correct the various aberrations in the first group. Particularly, when short distance photography is effected only by the first group, fluctuations of spherical aberration and astigmatism will become excessive on the long focal length side as compared with the infinity photography condition and this is unsuitable. Also, a predetermined zoom ratio must be obtained and therefore, the narrowed principal point spacing between the respective groups must be compensated for by intensifying the refractive power of each group of the zoom portion and thus, correction of aberrations will again be difficult. On the other hand, if the lower limit of this condition is exceeded, the amount of movement of the first group during short distance photography will become excessive and therefore, the lens barrel structure will become complicated and compactness will also suffer. Generally, when the zoom ratio becomes greater, the entrance pupil on the wide side becomes more distant, and condition (3) prescribes the amount corresponding to the incidence height at which the principal ray of a maximum angle of view at infinity crosses the first lens surface, and also prescribes an appropriate range of position of the entrance pupil.

If the upper limit of this condition is exceeded, the entrance pupil will become more distant and the incidence height of the principal ray will become greater and therefore, during very close range photography, a decrease in quantity of marginal light will occur from a relatively long photographing distance and, if the lower limit of this condition is exceeded, the zoom ratio will become small and this is unsuitable.

In the zoom lens according to the present invention as described above, it is further desirable that the second group $G_2$ comprise, in succession from the object side, a cemented lens component $L_{21}$ consisting of three negative, positive and negative lenses $L_{2a}$, $L_{2b}$ and $L_{2c}$ cemented together and having a composite negative refractive power, and a negative lens component $L_{22}$ and that the following conditions be satisfied:

$$0 < \frac{f_2}{r_6} < 0.4 \quad (4)$$

$$-0.1 < f_{21}\left(\frac{1}{f_{2a}\nu_{2a}} + \frac{1}{f_{2b}\nu_{2b}}\right) < -0.03 \quad (5)$$

$$-0.07 < f_{21}\left(\frac{1}{f_{2b}\nu_{2b}} + \frac{1}{f_{2c}\nu_{2c}}\right) < -0.03 \quad (6)$$

where $r_6$ represents the radius of curvature of that surface in the second group which is most adjacent to the object side, $f_2$ represents the composite focal length of the second group, $f_{21}$ and $f_{22}$ represent the focal lengths of the cemented negative lens component $L_{21}$ and the negative lens component $L_{22}$, respectively, in the second group, $f_{2a}$, $f_{2b}$, and $f_{2c}$ represent the focal lengths of the negative, positive and negative lenses $L_{2a}$, $L_{2b}$ and $L_{2c}$ constituting the cemented negative lens component $L_{21}$, and $\nu_{2a}$, $\nu_{2b}$ and $\nu_{2c}$ represent the Abbe numbers of these lenses.

By thus providing the negative lens component $L_{21}$ comprising three negative, positive and negative lenses cemented together in the second group $G_2$ as the magnification changing group, good correction of the various aberrations for the standard wavelength as well as astigmatism and coma particularly in the short focal length condition which provides a wide angle of the view particularly in the vicinity of g-line ($\lambda = 435.8$ nm) becomes possible. In the conventional four-group telephoto zoom lens, the various aberrations for the standard wavelength have been corrected to a certain degree, but the fluctuation of chromatic aberration by zooming could not be corrected perfectly, whereas the present invention has succeeded in well balancing the various aberrations for the standard wavelength and the fluctuation of chromatic aberration by zooming by forming the negative lens component in the second group which is adjacent to the objective side by three lenses cemented together. It is known to provide a cemented surface for the correction of chromatic aberration, but in the zoom lens of this type, in order that the fluctuations of the aberrations for the standard wavelength and the fluctuation of chromatic aberration by zooming may be corrected in a well balanced condition, it is most effective to adopt the above-described cemented construction particularly for the second group and this is not mere addition of a cemented surface. By the addition of this cemented surface $r_7$, a degree of freedom of the aberration correction in the second group has been attained and therefore, in the next cemented surface $r_8$, the burden for the correction of chromatic aberration has been reduced and it has become possible to attendantly produce the degree of freedom with which attention can be concentrated upon the correction of coma and astigmatism for the standard wavelength. As a result, there can be realized a zoom lens which holds a good optical performance in the entire magnification change range and moreover from infinity to a short distance. Particularly, by adopting the above-described construction for the second group, the performance in infinity photography as well as the optical performance in close range photography has been greatly improved with a result that photography at short distances has become possible. Specifically, in the second group, the difference in refractive index for the standard wavelength has not been made so great but the difference in dispersion has been made great on the opposite sides of the first cemented surface $r_7$ formed by the negative lens $L_{2a}$ and the positive lens $L_{2b}$ while, on the other hand, the difference in refractive index for the standard wavelength has been positively made great on the opposite sides of the second cemented surface $r_8$ formed by the positive lens $L_{2b}$ and the negative lens $L_{2c}$. In the first cemented surface $r_7$, chromatic aberration has been corrected without so much aggravating the fluctuations of the aberrations for the standard wavelength and the chromatic aberration correction in the second cemented surface $r_8$ has been made up for and at the same time, the coma and astigmatism particularly on the short focal length side for the g-line created therein have been corrected. Also, in the second cemented surface $r_8$, the negative curvature of image field chiefly in the long focal length condition is corrected and at the same time, coma is reduced.

Condition (4) is for minimizing the bending of the best image plane when the second group is also moved toward the object side with the first group in the second focusing system according to the present invention and thereby always maintaining a stable image plane. If the lower limit of this condition is exceeded, the foremost lens surface $r_6$ in the second group will become convex toward the object side and therefore, aggravation of various aberrations will be substantial during short distance photography at the telephoto end and the bending of the image plane at the wide angle end will be substantial. Conversely, if the curvature of the foremost lens surface $r_6$ becomes sharper beyond the upper limit of this condition, distortion at the wide angle will become so noticeable that it will be difficult to correct the fluctuation of distortion resulting from zooming.

Conditions (5) and (6) are for balancing the correction of chromatic aberration while well correcting the various aberrations for the standard wavelength, particularly the fluctuation of coma resulting from zooming, by the two cemented surfaces in the second group. Condition (5) is concerned with the first cemented surface $r_7$ convex toward the object side which is formed by the negative lens $L_{2a}$ and the positive lens $L_{2b}$, and condition (6) is concerned with the second cemented surface $r_8$ convex toward the image side which is formed by the positive lens $L_{2b}$ and the negative lens $L_{2c}$. Since the first cemented surface $r_7$ is convex toward the object side, it is advantageous for the correction of chromatic aberration but is not very effective for the correction of coma, and since the second cemented surface $r_8$ is convex toward the image side, it is liable to create chromatic aberration but is effective for the correction of coma. If the upper limits of conditions (5) and (6) are exceeded, on-axis chromatic aberration will become excessively positive particularly on the long focal length side and chromatic difference of magnification will become excessively negative on the short focal length side and these will both be under-corrected, with the second group having a negative refractive power. If the lower limits of these conditions are exceeded, on-axis chromatic aberration will become excessively negative on the long focal length side and chromatic difference of magnification will become excessively positive on the short focal length side and thus, achromatization of the second group will become excessive.

In the third and fourth groups succeeding the second group, on-axis chromatic aberration and chromatic difference of magnification can be corrected only in the same sense and therefore, it is necessary that appropriate balance of the on-axis chromatic aberration and chromatic difference of magnification in the second group be maintained by conditions (5) and (6). If achromatization is effected only by the second cemented surface $r_8$, chromatic astigmatism and chromatic coma on the short focal length side will be created and on the other hand, if achromatization is effected only by the first cemented surface $r_7$, chromatic aberration can be corrected to a certain degree but it will be difficult to correct coma and curvature of image field for the standard wavelength particularly in the intermediate focal length to the long focal length condition. Therefore, as shown in conditions (5) and (6), two first and second cemented surfaces become necessary in the second group.

Some embodiments of the present invention will hereinafter be described in detail.

Figure 3:
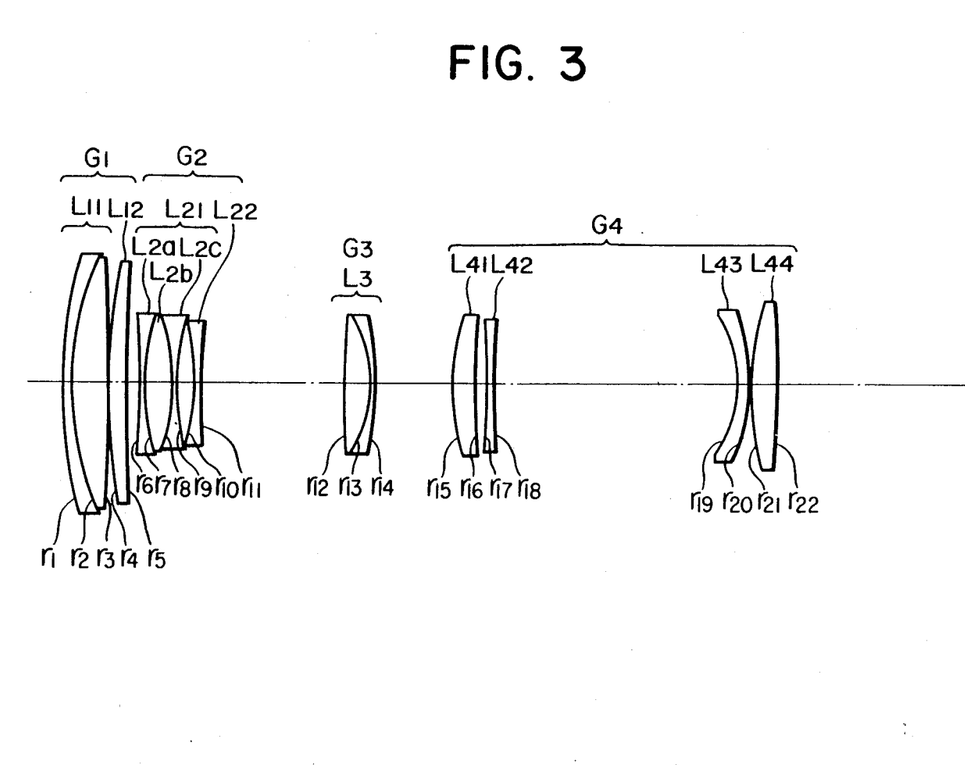
FIG. 3 shows the lens arrangement of the first embodiment in the shortest focal length condition.
Figure 4:
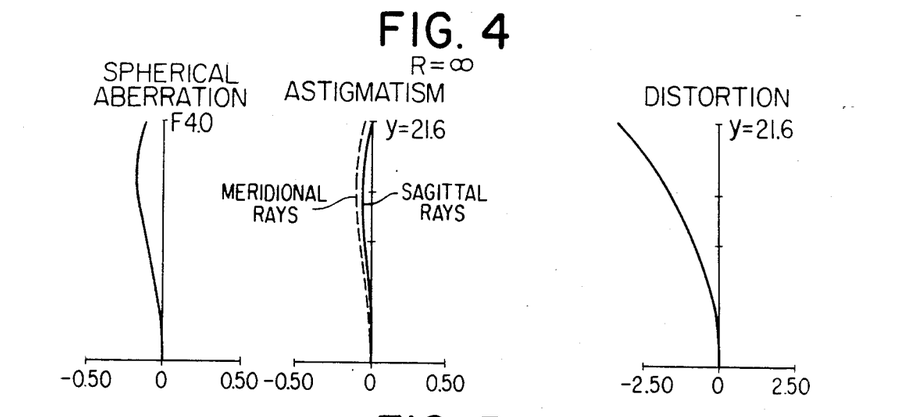
FIG. 4 shows the aberrations in the first embodiment during infinity photography.
Figure 5:
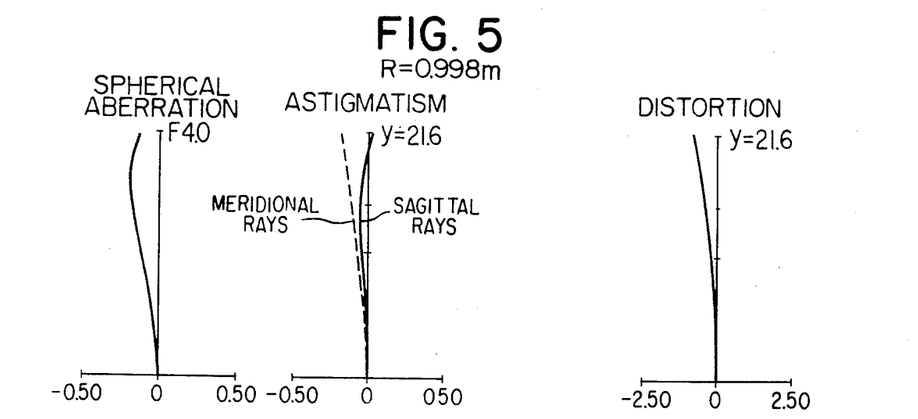
FIG. 5 shows the aberrations in the first embodiment when the object distance R=0.998 m.
Figure 6:
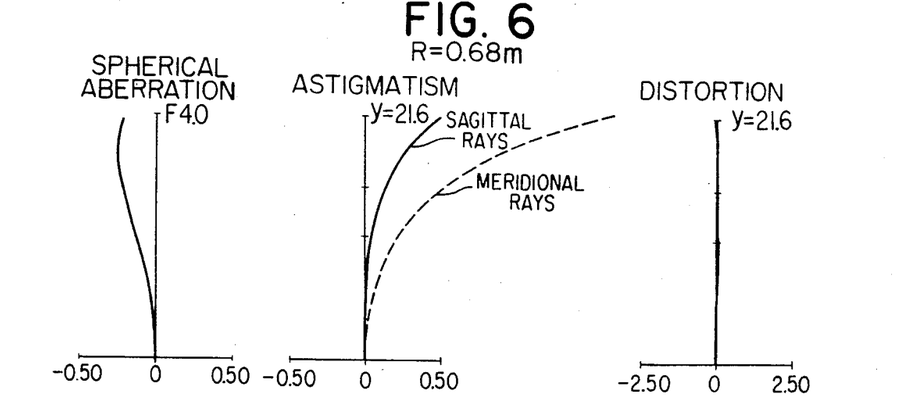
FIGS. 6 to 8 show the aberrations in the first embodiment when the object distance R=0.68 m, FIG. 6 showing the aberrations when focusing has been effected by moving only the first group, and FIGS. 7 and 8 showing the aberrations when the first and second groups have been moved toward the object side in the conditions of $\Delta D_1/\Delta D_2=1$ and $\Delta D_1/\Delta D_2=0$, respectively.
Figure 7:
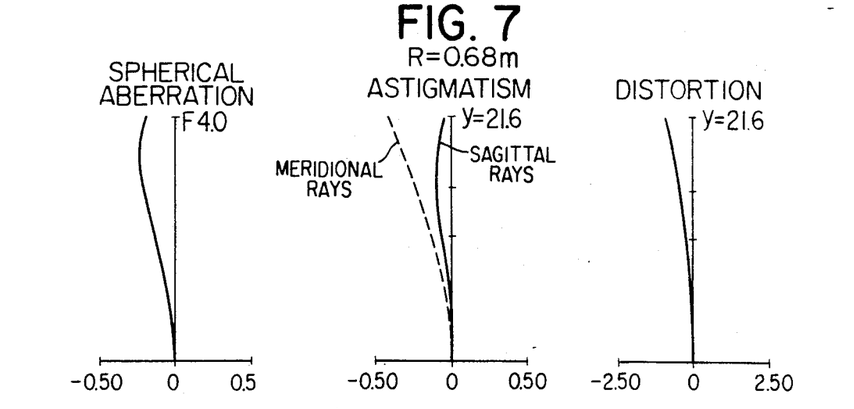
Figure 8:
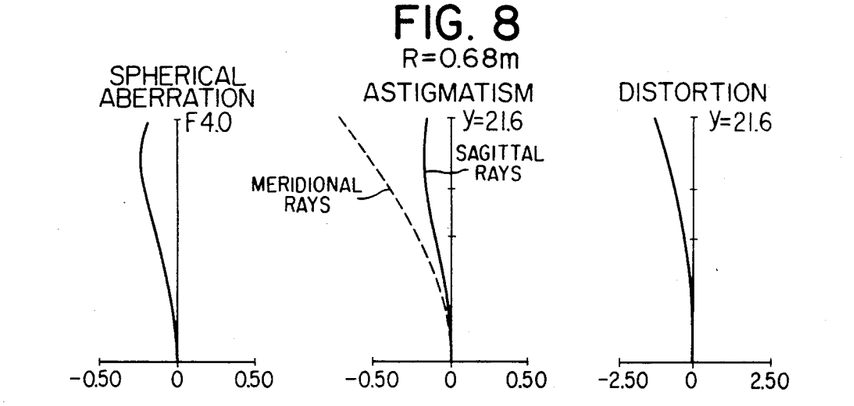

A first embodiment is a zoom lens of focal length $f=80-195.5$ mm and F-number 4.0. Table 1 below shows the lens data thereof, and Table 2 below shows the focal length of the wide end of each lens group, the arrangement of each lens group relative to the principal point spacing during close range photography and very close range photography, and the basic lens construction parameters. The manner in which the incidence height of the principal ray is deteriorated during close range photography and during very close range photography is shown in the microfocus system, and the comparison between respective systems is as shown in FIG. 2. FIG. 3 shows the lens arrangement in the shortest focal length condition, FIG. 4 shows the aberrations during infinity photography, and FIG. 5 shows the aberrations at the object distance $R=0.998$ m. FIGS. 6 to 8 show the aberrations at the object distance $R=0.68$ m, FIG. 6 showing the aberrations when focusing has been effected by moving only the first group, and FIGS. 7 and 8 showing the aberrations when the first and the second group have been moved toward the object side in the conditions of $\Delta D_1/\Delta D_2=1$ and $\Delta D_1/\Delta D_2=0$, respectively.

Figure 9:
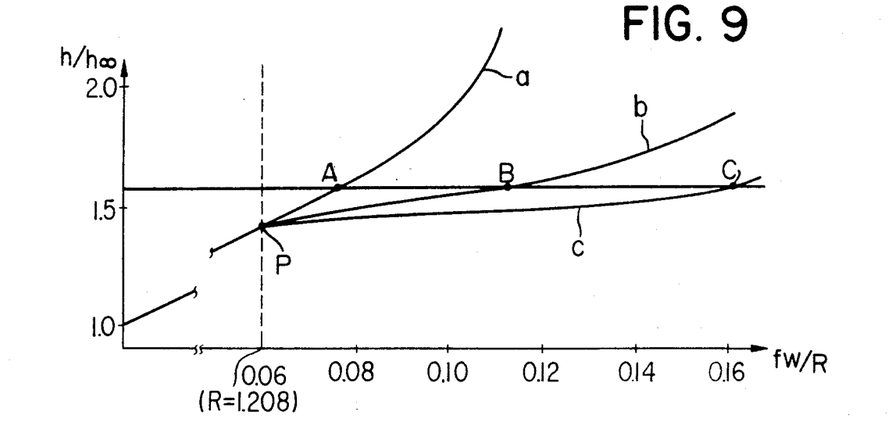
FIG. 9, like FIG. 2, shows the relation between the object distance and the height of the principal ray incident on the first group in a second embodiment.

In the first embodiment, as can be seen from FIG. 7, the focusing like $\Delta D_1/\Delta D_2=1$ is most desirable in correcting the aberrations. This corresponds to the focusing system represented by curve b in FIG. 2. However, other focusing systems will also be practically sufficient if they are within the ranges of said conditions.

lens system is substantially identical to that of FIG. 3 and therefore is not shown. FIG. 9, like FIG. 2, shows the relation between the object distance and the height of the principal ray incident on the first group in the second embodiment. As can be seen from FIG. 9, as the zoom ratio becomes greater, the incidence height of the principal ray onto the first lens surface from the infinity photography condition at the wide end becomes more distant from the optical axis on the wide side and there-

TABLE 1

(First Embodiment)

Focal length f = 80~195.2    F-number 4.0

| | | | | | | | |
|---|---|---|---|---|---|---|---|
| $r_1 =$ | 109.097 | $d_1 = 1.7$ | | $n_1 = 1.80518$ | $\nu_1 = 25.4$ | | |
| $r_2 =$ | 62.650 | $d_2 = 8.1$ | | $n_2 = 1.62041$ | $\nu_2 = 60.3$ | $L_{11}$ | |
| $r_3 =$ | −716.000 | $d_3 = 0.1$ | | | | | $G_1$ |
| $r_4 =$ | 134.056 | $d_4 = 4.0$ | | $n_3 = 1.51680$ | $\nu_3 = 64.1$ | $L_{12}$ | |
| $r_5 =$ | 603.844 | $d_5 = 3.034{\sim}43.150$ | | | | | |
| $r_6 =$ | −300.000 | $d_6 = 1.0$ | | $n_4 = 1.78797$ | $\nu_4 = 47.5$ | $L_{2a}$ | |
| $r_7 =$ | 55.000 | $d_7 = 6.1$ | | $n_5 = 1.75520$ | $\nu_5 = 27.6$ | $L_{2b}$ $L_{21}$ | |
| $r_8 =$ | −40.000 | $d_8 = 0.9$ | | $n_6 = 1.58144$ | $\nu_6 = 40.8$ | $L_{2c}$ | |
| $r_9 =$ | 56.331 | $d_9 = 4.1$ | | | | | $G_2$ |
| $r_{10} =$ | −44.350 | $d_{10} = 1.1$ | | $n_7 = 1.58913$ | $\nu_7 = 61.2$ | $L_{22}$ | |
| $r_{11} =$ | 177.834 | $d_{11} = 30.972{\sim}1.366$ | | | | | |
| $r_{12} =$ | 155.000 | $d_{12} = 5.5$ | | $n_8 = 1.62041$ | $\nu_8 = 60.3$ | | |
| $r_{13} =$ | −31.792 | $d_{13} = 0.9$ | | $n_9 = 1.75520$ | $\nu_9 = 27.6$ | $L_3$ | $G_3$ |
| $r_{14} =$ | −68.917 | $d_{14} = 16.708{\sim}6.198$ | | | | | |
| $r_{15} =$ | 41.667 | $d_{15} = 5.3$ | | $n_{10} = 1.67025$ | $\nu_{10} = 57.6$ | $L_{41}$ | |
| $r_{16} =$ | 217.900 | $d_{16} = 2.0$ | | | | | |
| $r_{17} =$ | −692.473 | $d_{17} = 2.0$ | | $n_{11} = 1.79504$ | $\nu_{11} = 28.6$ | $L_{42}$ | |
| $r_{18} =$ | 299.735 | $d_{18} = 53.4$ | | | | | |
| $r_{19} =$ | −23.344 | $d_{19} = 2.4$ | | $n_{12} = 1.79668$ | $\nu_{12} = 45.5$ | $L_{43}$ | $G_4$ |
| $r_{20} =$ | −36.254 | $d_{20} = 0.2$ | | | | | |
| $r_{21} =$ | 72.000 | $d_{21} = 5.3$ | | $n_{13} = 1.58267$ | $\nu_{13} = 46.5$ | $L_{45}$ | |
| $r_{22} =$ | −334.140 | $Bf = 41.366$ | | | | | |

TABLE 2

| | | First focusing | | Second focusing | |
|---|---|---|---|---|---|
| | | | a | b | c |
| $\Delta D_1/\Delta D_2$ | | ∞ | ∞ | 1 | 0 |
| fw or β | 80 | −0.1209 | −0.2516 | −0.1902 | −0.1802 |
| $D_0$ | ∞ | 783.5439 | 439.5381 | 455.2024 | 458.7667 |
| $D_1$ | 16.2464 | 38.5866 | 62.7589 | 42.8406 | 38.5866 |
| $D_2$ | 36.1233 | 36.1233 | 36.1233 | 40.3773 | 41.067 |
| $D_3$ | 14.3988 | 14.3988 | 14.3988 | 14.3988 | 14.3988 |
| $D_4$ | 112.5229 | 112.5229 | 112.5229 | 112.5229 | 112.5229 |

Figure 10:
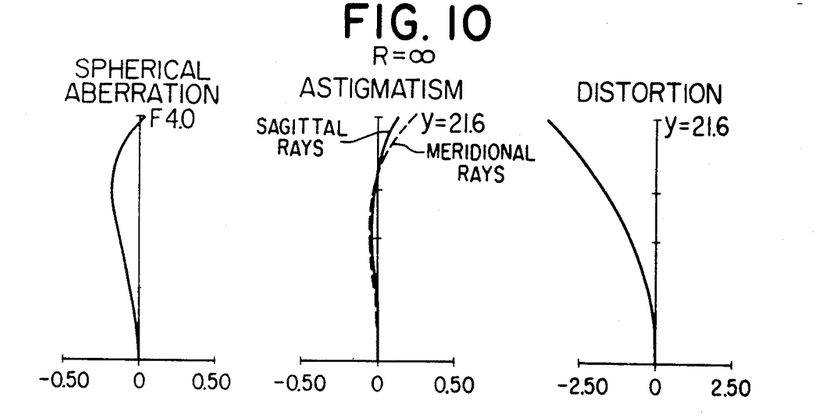
FIG. 10 shows the aberrations in the second embodiment in the infinity photography condition.
Figure 11:
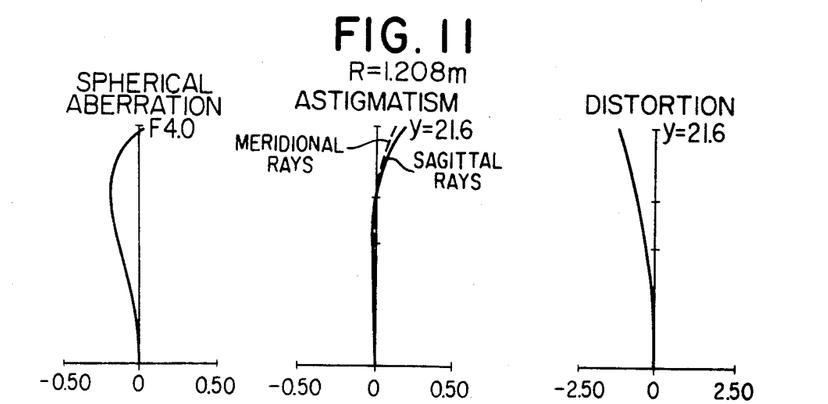
FIG. 11 shows the aberrations in the second embodiment when the object distance R=1.208 m.
Figure 12:
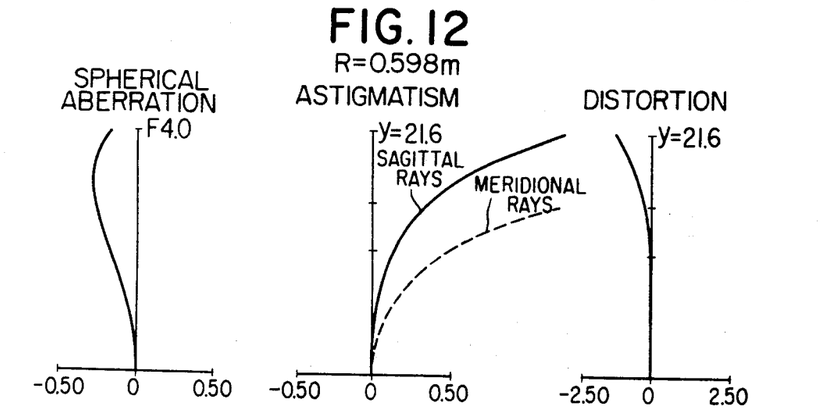
FIG. 12 shows the aberrations in the second embodiment when the object distance R=0.598 m and only the first group has been moved.
Figure 13:
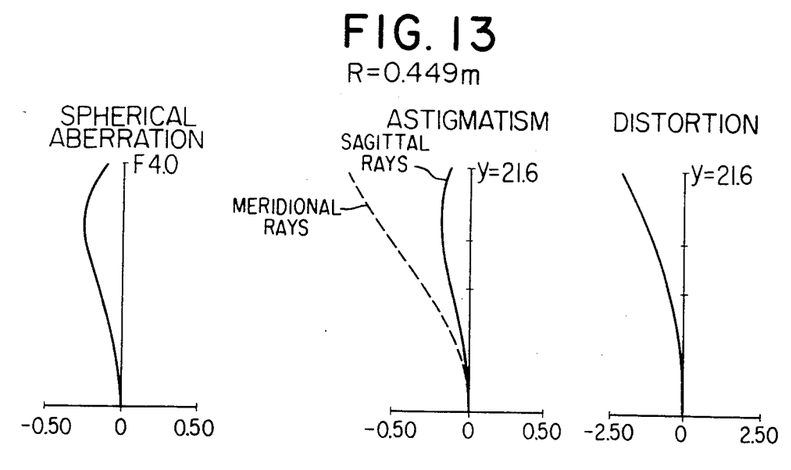
FIGS. 13 and 14 show the aberrations in the second embodiment when the object distance R=0.449 m and the first and second groups have been moved toward the object side in the conditions of $\Delta D_1/\Delta D_2=1$ and $\Delta D_1/\Delta D_2=0$, respectively.
Figure 14:
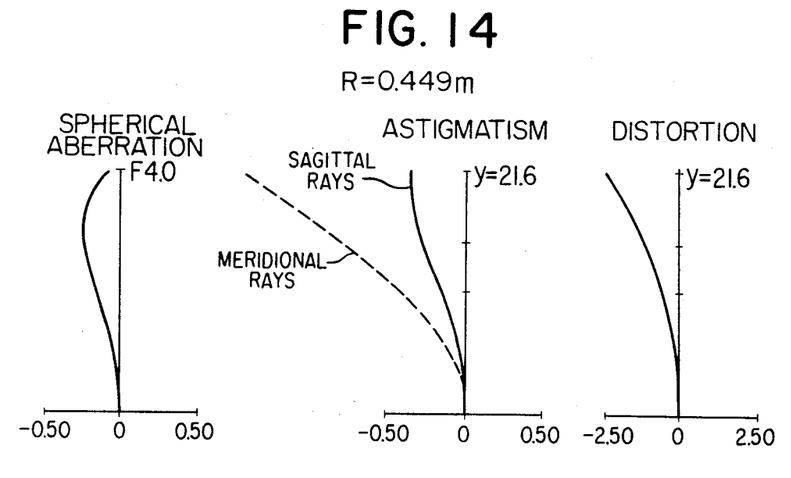

$f_1 = 121.6054$
$f_2 = -37.3837$
$f_3 = 94.0667$
$f_4 = 112.5229$
$h_\infty = -16.243$
$fw/f_1 = 0.658$
$D_2\gamma/fw = 0.945$
$f_2/r_6 = 0.125$ fore, aperture eclipse is liable to occur during very close range photography and thus, it becomes necessary to keep the quantity of marginal light and the optical performance by a macro system like that of the present invention. It will be seen that the short distance focusing system as shown by curve c in FIG. 9 is most desirable from the viewpoint of compactness. FIG. 10 shows the aberrations in the infinity photography condition. FIG. 11 shows the aberrations when R=1.028 m, FIG. 12 shows the aberrations when only the first group is moved and R=0.598 m, and FIGS. 13 and 14 shown the aberrations when R=0.449 m. FIGS. 13 and 14 show the aberrations when the first and second groups have been moved toward the object side in the conditions of $$\frac{\Delta D_1}{\Delta D_2} = 1 \quad \text{and} \quad \frac{\Delta D_1}{\Delta D_2} = 0,$$

respectively.

A second embodiment in a zoom lens of focal length f=71.8–204 mm and F-number 4.0, and its zoom ratio is about 3. Table 3 below shows the numerical data of each lens and Table 4 below, like Table 2 of the first embodiment, shows each value. The arrangement of the

TABLE 3

(Second Embodiment)

Focal length f = 71.8~204    F-number 4.0

| | | | | | | | |
|---|---|---|---|---|---|---|---|
| $r_1 =$ | 126.032 | $d_1 = 1.6$ | | $n_1 = 1.80518$ | $\nu_1 = 25.4$ | | |
| $r_2 =$ | 69.600 | $d_2 = 8.5$ | | $n_2 = 1.51680$ | $\nu_2 = 64.1$ | $L_{11}$ | |
| $r_3 =$ | −1600.100 | $d_3 = 0.1$ | | | | | $G_1$ |
| $r_4 =$ | 91.280 | $d_4 = 6.5$ | | $n_3 = 1.51680$ | $\nu_3 = 64.1$ | $L_{12}$ | |
| $r_5 =$ | −1021.837 | $d_5 = 2.8341{\sim}46.2225$ | | | | | |
| $r_6 =$ | −428.120 | $d_6 = 0.9$ | | $n_4 = 1.76684$ | $\nu_4 = 46.8$ | $L_{2a}$ | |
| $r_7 =$ | 75.000 | $d_7 = 6.0$ | | $n_5 = 1.80518$ | $\nu_5 = 25.4$ | $L_{2b}$ $L_{21}$ | |
| $r_8 =$ | −43.984 | $d_8 = 0.9$ | | $n_6 = 1.67003$ | $\nu_6 = 47.1$ | $L_{2c}$ | |
| $r_9 =$ | 47.810 | $d_9 = 5.0$ | | | | | $G_2$ |
| $r_{10} =$ | −47.377 | $d_{10} = 1.0$ | | $n_7 = 1.76684$ | $\nu_7 = 46.8$ | $L_{22}$ | |
| $r_{11} =$ | 1046.941 | $d_{11} = 31.6077{\sim}1.6601$ | | | | | |
| $r_{12} =$ | 132.032 | $d_{12} = 5.5$ | | $n_8 = 1.65844$ | $\nu_8 = 50.8$ | | |
| $r_{13} =$ | −33.000 | $d_{13} = 0.9$ | | $n_9 = 1.80518$ | $\nu_9 = 25.4$ | $L_3$ | $G_3$ |

TABLE 3-continued (Second Embodiment)

Focal length f = 71.8~204    F-number 4.0

| | | | | | | | |
|---|---|---|---|---|---|---|---|
| $r_{14} =$ | −71.873 | $d_{14} = 19.8105 \sim 6.3696$ | | | | | |
| $r_{15} =$ | 34.350 | $d_{15} = 5.1$ | | | | | |
| $r_{16} =$ | 406.770 | $d_{16} = 1.9$ | $n_{10} = 1.62041$ | $\nu_{10} = 60.4$ | $L_{41}$ | | |
| $r_{17} =$ | −205.000 | $d_{17} = 1.9$ | $n_{11} = 1.75520$ | $\nu_{11} = 27.6$ | $L_{42}$ | | |
| $r_{18} =$ | 373.000 | $d_{18} = 45.0$ | | | | | $G_4$ |
| $r_{19} =$ | −19.410 | $d_{19} = 2.3$ | $n_{12} = 1.76684$ | $\nu_{12} = 46.8$ | $L_{43}$ | | |
| $r_{20} =$ | −35.800 | $d_{20} = 0.2$ | | | | | |
| $r_{21} =$ | 80.000 | $d_{21} = 5.0$ | $n_{13} = 1.58144$ | $\nu_{13} = 40.8$ | $L_{45}$ | | |
| $r_{22} =$ | −116.065 | | | | | | |

TABLE 4

| | First focusing | | Second focusing | | |
|---|---|---|---|---|---|
| | | a | | b | c |
| $\Delta D_1/\Delta D_2$ | | ∞ | ∞ | 1 | 0 |
| fw or β | 71.800 | −0.0807 | −0.2994 | −0.2645 | −0.2435 |
| $D_0$ | ∞ | 1005.8305 | 355.7990 | 227.6401 | 237.2131 |
| $D_1$ | 16.0466 | 31.1686 | 72.1603 | 40.7439 | 31.1686 |
| $D_2$ | 36.7350 | 36.7350 | 36.7350 | 46.3103 | 46.3126 |
| $D_3$ | 2.0998 | 2.0998 | 2.0998 | 2.0998 | 2.0998 |
| $D_4$ | 108.0000 | 108.0000 | 108.0000 | 108.0000 | 108.0000 |

Figure 16:
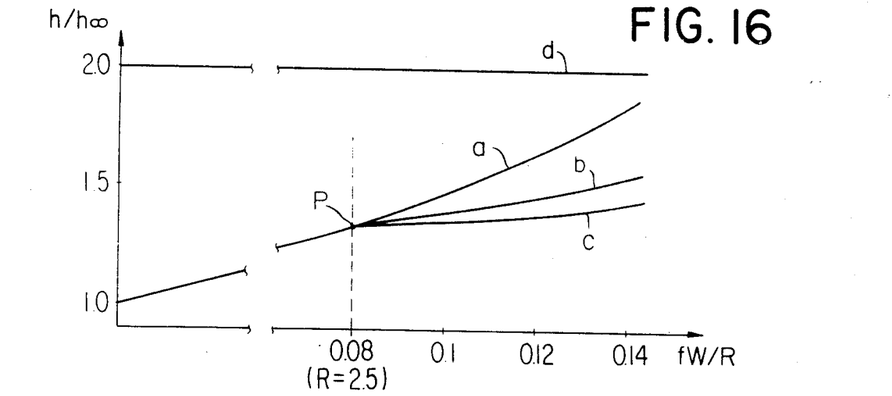
FIG. 16, like FIG. 2, shows a comparison between the incidence positions of the principal ray in a third embodiment.
Figure 20:
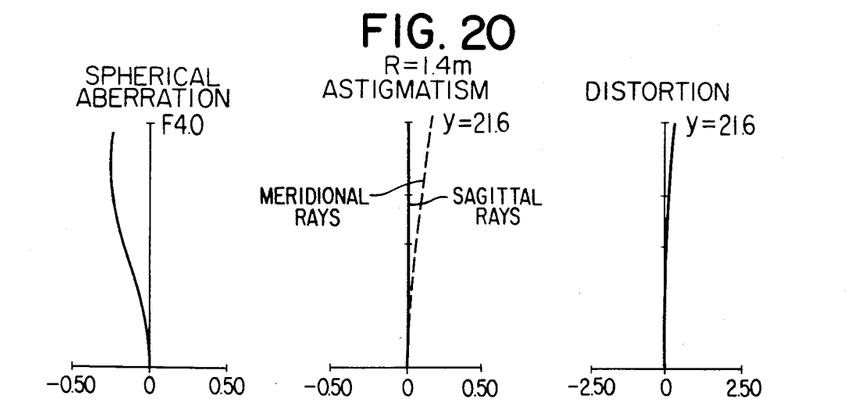
Figure 21:
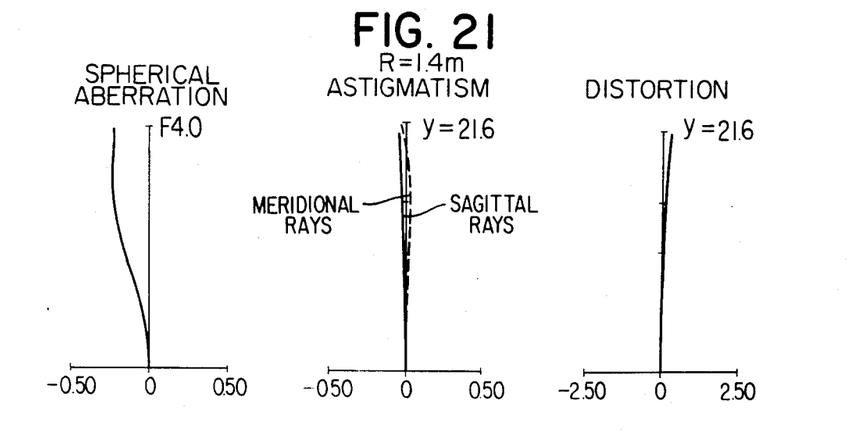

$f_1 = 116.0000$
$f_2 = -33.0000$ group toward the object side, and FIGS. 20 and 21 show the abberations when the first and second groups have been moved toward the object side at the speeds of $\Delta D_1/\Delta D_2 = 1$ and $\Delta D_1/\Delta D_2 = 0$, respectively, and these Figures correspond to the curves a, b and c, respectively, in FIG. 16.

In the third embodiment, the decrease in quantity of marginal light is very small and this is very advantageous. As can be seen from FIGS. 20 and 21, it is most desirable to move the lens groups at the speed of the curve c shown in FIG. 16.

TABLE 5

(Third Embodiment)

Focal length f = 200~400    F-number 4.0

| | | | | | | | |
|---|---|---|---|---|---|---|---|
| $r_1 =$ | 239.867 | $d_1 = 3.3$ | $n_1 = 1.75692$ | $\nu_1 = 31.7$ | | | |
| $r_2 =$ | 140.839 | $d_2 = 14.0$ | $n_2 = 1.49782$ | $\nu_2 = 82.3$ | $L_{11}$ | | |
| $r_3 =$ | −430.000 | $d_3 = 0.2$ | | | | | $G_1$ |
| $r_4 =$ | 155.000 | $d_4 = 7.0$ | $n_3 = 1.49782$ | $\nu_3 = 82.3$ | $L_{12}$ | | |
| $r_5 =$ | 240.871 | $d_5 = 50.635 \sim 111.267$ | | | | | |
| $r_6 =$ | −366.200 | $d_6 = 2.5$ | $n_4 = 1.78797$ | $\nu_4 = 47.5$ | $L_{2a}$ | | |
| $r_7 =$ | 143.200 | $d_7 = 8.0$ | $n_5 = 1.75520$ | $\nu_5 = 27.6$ | $L_{2b}$ | $L_{21}$ | |
| $r_8 =$ | −110.916 | $d_8 = 2.2$ | $n_6 = 1.51680$ | $\nu_6 = 64.1$ | $L_{2c}$ | | |
| $r_9 =$ | 100.127 | $d_9 = 7.5$ | | | | | $G_2$ |
| $r_{10} =$ | −117.970 | $d_{10} = 2.5$ | $n_7 = 1.80218$ | $\nu_7 = 44.7$ | $L_{22}$ | | |
| $r_{11} =$ | −5626.023 | $d_{11} = 56.297 \sim 3.155$ | | | | | |
| $r_{12} =$ | 184.117 | $d_{12} = 10.0$ | $n_8 = 1.49782$ | $\nu_8 = 82.3$ | $L_3$ | | |
| $r_{13} =$ | −68.320 | $d_{13} = 1.9$ | $n_9 = 1.75692$ | $\nu_9 = 31.7$ | | | $G_3$ |
| $r_{14} =$ | −123.600 | $d_{14} = 15.464 \sim 7.975$ | | | | | |
| $r_{15} =$ | 70.180 | $d_{15} = 11.0$ | $n_{10} = 1.49782$ | $\nu_{10} = 82.3$ | $L_{41}$ | | |
| $r_{16} =$ | −130.821 | $d_{16} = 10.0$ | | | | | |
| $r_{17} =$ | −96.159 | $d_{17} = 3.0$ | $n_{11} = 1.78797$ | $\nu_{11} = 47.5$ | $L_{42}$ | | |
| $r_{18} =$ | −900.350 | $d_{18} = 0.6$ | | | | | |
| $r_{19} =$ | 37.000 | $d_{19} = 6.5$ | $n_{12} = 1.51680$ | $\nu_{12} = 64.1$ | $L_{43}$ | | $G_4$ |
| $r_{20} =$ | 41.623 | $d_{20} = 66.0$ | | | | | |
| $r_{21} =$ | −26.710 | $d_{21} = 2.5$ | $n_{13} = 1.77279$ | $\nu_{13} = 49.4$ | $L_{44}$ | | |
| $r_{22} =$ | −81.538 | $d_{22} = 0.1$ | | | | | |
| $r_{23} =$ | 168.000 | $d_{23} = 2.0$ | $n_{14} = 1.73350$ | $\nu_{14} = 51.1$ | | | |
| $r_{24} =$ | 72.000 | $d_{24} = 6.5$ | $n_{15} = 1.58144$ | $\nu_{15} = 40.8$ | $L_{45}$ | | |
| $r_{25} =$ | −55.442 | $Bf = 69.828$ | | | | | |

Figure 15:
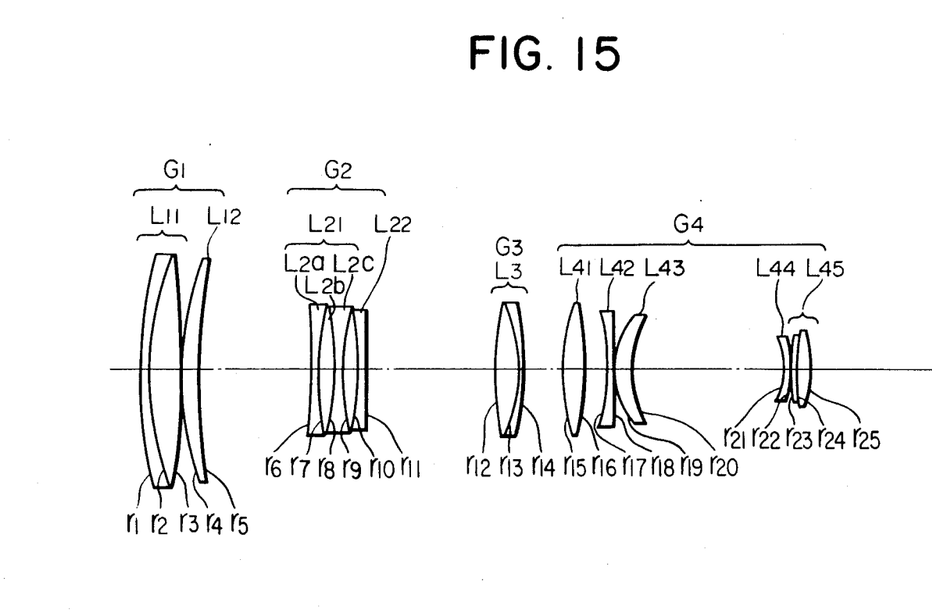
FIG. 15 shows the lens arrangement during infinity photography at the wide end f=200 mm.
Figure 17:
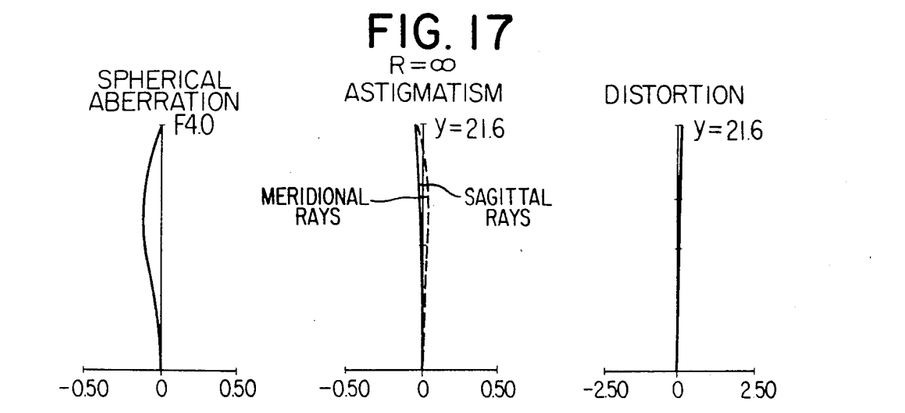
FIG. 17 shows the aberrations in the third embodiment at infinity.
Figure 18:
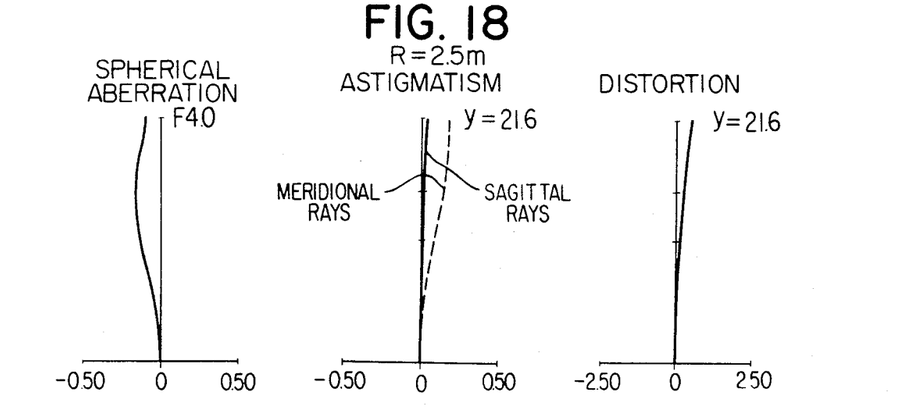
FIG. 18 shows the aberrations in the third embodiment when the object distance R=2.5 m.
Figure 19:
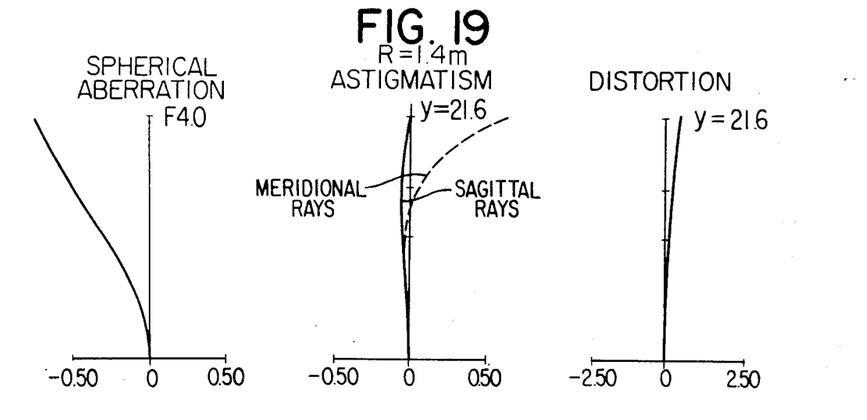
FIGS. 19–21 shows the aberrations in the third embodiment when focusing has been effected during very close range photography (R=1.4 m), FIG. 19 showing the aberrations when focusing has been effected by moving only the first group toward the object side, and FIGS. 20 and 21 showing the aberrations when the first and second groups have been moved toward the object side in the condition of $\Delta D_1/\Delta D_2=1$ and $\Delta D_1/\Delta D_2=0$, respectively.

$f_3 = 86.0000$
$f_4 = 108.0000$
$h_\infty = -18.407$
$fw/f_1 = 0.6189$
$D_2\gamma/fw = 1.211$
$f_2/r_6 = 0.0771$ A third embodiment is a zoom lens of focal length f=200-400 mm and F-number 4.0. Table 5 below shows the numerical data of each lens, and Table 6 below shows the parameters which prescribe the basic construction of the lens. FIG. 15 shows the arrangement of the wide terminal f=200 mm during infinity photography. FIG. 16, like FIGS. 2 and 9, shows a comparison between the incidence positions of the principal ray, and FIG. 17 shows the aberrations at infinity. FIG. 18 shows the abberations when the object distance R=2.5 m. FIGS. 19 to 21 show the aberrations when focusing has been effected during very close range photography (R=1.4 m). FIG. 19 shows the aberrations when focusing has been accomplished by moving only the first

TABLE 6

| | First focusing | | Second focusing | | |
|---|---|---|---|---|---|
| | | a | | b | c |
| $\Delta D_1/\Delta D_2$ | | ∞ | ∞ | 1 | 0 |
| fw or β | 200.0000 | −0.1094 | −0.3057 | −0.2018 | −0.1834 |
| $D_0$ | ∞ | 2102.9190 | 928.8761 | 971.3529 | 984.3690 |
| $D_1$ | 73.1132 | 114.3729 | 188.4158 | 130.1559 | 114.3729 |
| $D_2$ | 66.5824 | 66.5824 | 66.5824 | 82.3654 | 85.1324 |
| $D_3$ | −88.6465 | −88.6465 | −88.6465 | −88.6465 | −88.6465 |
| $D_4$ | 220.0000 | 220.0000 | 220.0000 | 220.0000 | 220.0000 |

$f_1 = 274.6520$
$f_2 = -80.2756$
$f_3 = 200.0000$
$f_4 = 220.0000$
$h_\infty = -25.966$
$fw/f_1 = 0.728$
$D_2\gamma/fw = 0.666$
$f_2/r_6 = 0.219$ It will be seen from the aberration graphs of each embodiment that when focusing is effected to an object at the shortest distance, if only the first group is moved, astigmatism is substantial and the image plane is greatly curved in the positive sense, whereas according to the second focusing in which the second group is also moved in a predetermined relation, the various aberrations are maintained good. Moreover, according to the second focusing, focusing can be accomplished to a very short distance without the aperture of the foremost lens being increased, as seen in FIGS. 2, 9 and 16.

According to the present invention, as has been described above, there can be provided a zoom lens which not only has an excellent imaging performance in ordinary photography but also can be continuously focused to objects from infinity to a short distance and in which the aperture of the foremost lens is small to make the entire lens system into a compact shape.

I claim:

1. An improved zoom lens having, in succession from the object side, a first lens group as a convergent focusing group, a second lens group as a divergent magnification changing group, a third lens group as a convergent correcting group, and a fourth lens group as a convergent relay system, said second group and said third group being movable relative to each other along the optical axis to thereby change the magnification while keeping the image plane at a predetermined position, wherein the improvement comprises means for moving said first group toward the object side when the said zoom lens is focused to objects from infinity to a predetermined short distance, and means for moving said first group and said second group along the optical axis at the same time while said third group is maintained at a predetermined position relative to the image plane when said zoom lens is focused to an object at a distance shorter than said predetermined short distance.

2. The zoom lens according to claim 1, satisfying the following conditions:

$$-1.0 < \frac{\Delta D_1}{\Delta D_2} < 2.0 \quad (1)$$

$$0.5 < \frac{f_w}{f_1} < 0.8 \quad (2)$$

$$0.5 < \frac{D_2 \cdot \gamma}{f_w} < 1.5 \quad (3)$$

where
$\Delta D_1$: the amount of variation in the principal point spacing between said first group and said second group
$\Delta D_2$: the amount of variation in the principal point spacing between said second group and said third group
$f_w$: the shortest focal length of the entire system
$f_1$: the focal length of said first group
$D_2$: the principal point spacing between said second group and said third group in the shortest focal length condition and during infinite-focus
$\gamma$: zoom ratio.

3. The zoom lens according to claim 2, wherein said second group ($G_2$) has, in succession from the object side, a cemented lens component ($L_{21}$) comprising negative, positive and negative lenses ($L_{2a}$, $L_{2b}$, $L_{2c}$) cemented together and having a composite negative refractive power, and a negative lens component ($L_{22}$).

4. The zoom lens according to claim 3, further satisfying the following conditions:

$$0 < \frac{f_2}{r_6} < 0.4 \quad (4)$$

$$-0.1 < f_{21}\left(\frac{1}{f_{2a}\nu_{2a}} + \frac{1}{f_{2b}\nu_{2b}}\right) < -0.03 \quad (5)$$

$$-0.07 < f_{21}\left(\frac{1}{f_{2b}\nu_{2b}} + \frac{1}{f_{2c}\nu_{2c}}\right) < -0.03 \quad (6)$$

where $r_6$ represents the radius of curvature of that surface in said second group which is most adjacent to the object side, $f_2$ represents the composite focal length of said second group, $f_{21}$ and $f_{22}$ represent the focal lengths of said cemented negative lens component ($L_{21}$) and said negative lens component ($L_{22}$), respectively, in said second group, $f_{2a}$, $f_{2b}$ and $f_{2c}$ represent the focal lengths of said negative, positive and negative lenses ($L_{2a}$, $L_{2b}$, $L_{2c}$) forming said cemented negative lens component ($L_{21}$), and $\nu_{2a}$, $\nu_{2b}$ and $\nu_{2c}$ represent the Abbe numbers of said three lenses respectively.

5. The zoom lens according to claim 4, wherein numerical data are as follows:

| (First Embodiment) | | | | | | | |
|---|---|---|---|---|---|---|---|
| Focal length f = 80~195.2 | | | F-number 4.0 | | | | |
| $r_1 =$ 109.097 | $d_1 = 1.7$ | $n_1 = 1.80518$ | $\nu_1 = 25.4$ | | | | |
| $r_2 =$ 62.650 | $d_2 = 8.1$ | $n_2 = 1.62041$ | $\nu_2 = 60.3$ | $L_{11}$ | | | |
| $r_3 =$ −716.000 | $d_3 = 0.1$ | | | | | $G_1$ | |
| $r_4 =$ 134.056 | $d_4 = 4.0$ | $n_3 = 1.51680$ | $\nu_3 = 64.1$ | $L_{12}$ | | | |
| $r_5 =$ 603.844 | $d_5 = 3.034~43.150$ | | | | | | |
| $r_6 =$ −300.000 | $d_6 = 1.0$ | $n_4 = 1.78797$ | $\nu_4 = 47.5$ | $L_{2a}$ | | | |
| $r_7 =$ 55.000 | $d_7 = 6.1$ | $n_5 = 1.75520$ | $\nu_5 = 27.6$ | $L_{2b}$ | $L_{21}$ | | |
| $r_8 =$ −40.000 | $d_8 = 0.9$ | $n_6 = 1.58144$ | $\nu_6 = 40.8$ | $L_{2c}$ | | | |
| $r_9 =$ 56.331 | $d_9 = 4.1$ | | | | | $G_2$ | |
| $r_{10} =$ −44.350 | $d_{10} = 1.1$ | $n_7 = 1.58913$ | $\nu_7 = 61.2$ | $L_{22}$ | | | |
| $r_{11} =$ 177.834 | $d_{11} = 30.972~1.366$ | | | | | | |
| $r_{12} =$ 155.000 | $d_{12} = 5.5$ | $n_8 = 1.62041$ | $\nu_8 = 60.3$ | | | | |
| $r_{13} =$ −31.792 | $d_{13} = 0.9$ | $n_9 = 1.75520$ | $\nu_9 = 27.6$ | $L_3$ | | $G_3$ | |
| $r_{14} =$ −68.917 | $d_{14} = 16.708~6.198$ | | | | | | |
| $r_{15} =$ 41.667 | $d_{15} = 5.3$ | | | | | | |
| $r_{16} =$ 217.900 | $d_{16} = 2.0$ | $n_{10} = 1.67025$ | $\nu_{10} = 57.6$ | $L_{41}$ | | | |
| $r_{17} =$ −692.473 | $d_{17} = 2.0$ | $n_{11} = 1.79504$ | $\nu_{11} = 28.6$ | $L_{42}$ | | | |
| $r_{18} =$ 299.735 | $d_{18} = 53.4$ | | | | | | |

-continued

| (First Embodiment) | | | | | | |
|---|---|---|---|---|---|---|
| Focal length f = 80~195.2 | | | F-number 4.0 | | | |
| $r_{19} = -23.344$ | $d_{19} = 2.4$ | | $n_{12} = 1.79668$ $\nu_{12} = 45.5$ | | $L_{43}$ | $G_4$ |
| $r_{20} = -36.254$ | $d_{20} = 0.2$ | | | | | |
| $r_{21} = 72.000$ | $d_{21} = 5.3$ | | $n_{13} = 1.58267$ $\nu_{13} = 46.5$ | | $L_{45}$ | |
| $r_{22} = -334.140$ | Bf = 41.366 | | | | | |

| | | | First focusing | | Second focusing | |
|---|---|---|---|---|---|---|
| | | | | a | b | c |
| $\Delta D_1/\Delta D_2$ | | | ∞ | ∞ | 1 | 0 |
| fw or β | 80 | | −0.1209 | −0.2516 | −0.1902 | −0.1802 |
| $D_0$ | ∞ | | 783.5439 | 439.5381 | 455.2024 | 458.7667 |
| $D_1$ | 16.2464 | | 38.5866 | 62.7589 | 42.8406 | 38.5866 |
| $D_2$ | 36.1233 | | 36.1233 | 36.1233 | 40.3773 | 41.067 |
| $D_3$ | 14.3988 | | 14.3988 | 14.3988 | 14.3988 | 14.3988 |
| $D_4$ | 112.5229 | | 112.5229 | 112.5229 | 112.5229 | 112.5229 |

$f_1 = 121.6054$
$f_2 = -37.3837$
$f_3 = 94.0667$
$f_4 = 112.5229$
$h_\infty = -16.243$
$fw/f_1 = 0.658$
$D_{2\gamma}/fw = 0.945$
$f_2/r_6 = 0.125$ where $r_1, r_2, r_3, \ldots$ represent the radii of curvature of the successive lens surfaces, $d_1, d_2, d_3, \ldots$ represent the center thicknesses and air spaces of the successive lenses, $n_1, n_2, n_3, \ldots$ represent the refractive indices of the successive lenses, and $\nu_1, \nu_2, \nu_3, \ldots$ represent the Abbe Numbers of the successive lenses.

6. The zoom lens according to claim 4, wherein numerical data are as follows:

where $r_1, r_2, r_3, \ldots$ represent the radii of curvature of the successive lens surfaces, $d_1, d_2, d_3, \ldots$ represent the center thicknesses and air spaces of the successive lenses, $n_1, n_2, n_3, \ldots$ represent the refractive indices of the successive lenses, and $\nu_1, \nu_2, \nu_3, \ldots$ represent the Abbe numbers of the successive lenses.

7. The zoom lens according to claim 4, wherein numerical data are as follows:

| (Second Embodiment) | | | | | |
|---|---|---|---|---|---|
| Focal length f = 71.8~204 | | | F-number 4.0 | | |
| $r_1 = 126.032$ | $d_1 = 1.6$ | $n_1 = 1.80518$ $\nu_1 = 25.4$ | | | |
| $r_2 = 69.600$ | $d_2 = 8.5$ | $n_2 = 1.51680$ $\nu_2 = 64.1$ | $L_{11}$ | | $G_1$ |
| $r_3 = -1600.100$ | $d_3 = 0.1$ | | | | |
| $r_4 = 91.280$ | $d_4 = 6.5$ | $n_3 = 1.51680$ $\nu_3 = 64.1$ | $L_{12}$ | | |
| $r_5 = -1021.837$ | $d_5 = 2.8341\sim46.2225$ | | | | |
| $r_6 = -428.120$ | $d_6 = 0.9$ | $n_4 = 1.76684$ $\nu_4 = 46.8$ | $L_{2a}$ | | |
| $r_7 = 75.000$ | $d_7 = 6.0$ | $n_5 = 1.80518$ $\nu_5 = 25.4$ | $L_{2b}$ | $L_{21}$ | |
| $r_8 = -43.984$ | $d_8 = 0.9$ | $n_6 = 1.67003$ $\nu_6 = 47.1$ | $L_{2c}$ | | |
| $r_9 = 47.810$ | $d_9 = 5.0$ | | | | $G_2$ |
| $r_{10} = -47.377$ | $d_{10} = 1.0$ | $n_7 = 1.76684$ $\nu_7 = 46.8$ | $L_{22}$ | | |
| $r_{11} = 1046.941$ | $d_{11} = 31.6077\sim1.6601$ | | | | |
| $r_{12} = 132.032$ | $d_{12} = 5.5$ | $n_8 = 1.65844$ $\nu_8 = 50.8$ | | | |
| $r_{13} = -33.000$ | $d_{13} = 0.9$ | $n_9 = 1.80518$ $\nu_9 = 25.4$ | $L_3$ | | $G_3$ |
| $r_{14} = -71.873$ | $d_{14} = 19.8105\sim6.3696$ | | | | |
| $r_{15} = 34.350$ | $d_{15} = 5.1$ | $n_{10} = 1.62041$ $\nu_{10} = 60.4$ | $L_{41}$ | | |
| $r_{16} = 406.770$ | $d_{16} = 1.9$ | | | | |
| $r_{17} = -205.000$ | $d_{17} = 1.9$ | $n_{11} = 1.75520$ $\nu_{11} = 27.6$ | $L_{42}$ | | |
| $r_{18} = 373.000$ | $d_{18} = 45.0$ | | | | |
| $r_{19} = -19.410$ | $d_{19} = 2.3$ | $n_{12} = 1.76684$ $\nu_{12} = 46.8$ | $L_{43}$ | | $G_4$ |
| $r_{20} = -35.800$ | $d_{20} = 0.2$ | | | | |
| $r_{21} = 80.000$ | $d_{21} = 5.0$ | $n_{13} = 1.58144$ $\nu_{13} = 40.8$ | $L_{45}$ | | |
| $r_{22} = -116.065$ | | | | | |

| | | First focusing | | Second focusing | |
|---|---|---|---|---|---|
| | | | a | b | c |
| $\Delta D_1/\Delta D_2$ | | ∞ | ∞ | 1 | 0 |
| fw or β | 71.800 | −0.0807 | −0.2994 | −0.2645 | −0.2435 |
| $D_0$ | ∞ | 1005.8305 | 355.7990 | 227.6401 | 237.2131 |
| $D_1$ | 16.0466 | 31.1686 | 72.1603 | 40.7439 | 31.1686 |
| $D_2$ | 36.7350 | 36.7350 | 36.7350 | 46.3103 | 46.3126 |
| $D_3$ | 2.0998 | 2.0998 | 2.0998 | 2.0998 | 2.0998 |
| $D_4$ | 108.0000 | 108.0000 | 108.0000 | 108.0000 | 108.0000 |

$f_1 = 116.0000$
$f_2 = -33.0000$
$f_3 = 86.0000$
$f_4 = 108.0000$
$h_\infty = -18.407$
$fw/f_1 = 0.6189$
$D_{2\gamma}/fw = 1.211$
$f_2/r_6 = 0.0771$

TABLE 5
(Third Embodiment)

Focal length f = 200~400    F-number 4.0

| | | | | | |
|---|---|---|---|---|---|
| $r_1 = 239.867$ | $d_1 = 3.3$ | $n_1 = 1.75692$ | $\nu_1 = 31.7$ | $L_{11}$ | |
| $r_2 = 140.839$ | $d_2 = 14.0$ | $n_2 = 1.49782$ | $\nu_2 = 82.3$ | | $G_1$ |
| $r_3 = -430.000$ | $d_3 = 0.2$ | | | | |
| $r_4 = 155.000$ | $d_4 = 7.0$ | $n_3 = 1.49782$ | $\nu_3 = 82.3$ | $L_{12}$ | |
| $r_5 = 240.871$ | $d_5 = 50.635~111.267$ | | | | |
| $r_6 = -366.200$ | $d_6 = 2.5$ | $n_4 = 1.78797$ | $\nu_4 = 47.5$ | $L_{2a}$ | |
| $r_7 = 143.200$ | $d_7 = 8.0$ | $n_5 = 1.75520$ | $\nu_5 = 27.6$ | $L_{2b}$ $L_{21}$ | |
| $r_8 = -110.916$ | $d_8 = 2.2$ | $n_6 = 1.51680$ | $\nu_6 = 64.1$ | $L_{2c}$ | |
| $r_9 = 100.127$ | $d_9 = 7.5$ | | | | $G_2$ |
| $r_{10} = -117.970$ | $d_{10} = 2.5$ | $n_7 = 1.80218$ | $\nu_7 = 44.7$ | $L_{22}$ | |
| $r_{11} = -5626.023$ | $d_{11} = 56.297~3.155$ | | | | |
| $r_{12} = 184.117$ | $d_{12} = 10.0$ | $n_8 = 1.49782$ | $\nu_8 = 82.3$ | $L_3$ | $G_3$ |
| $r_{13} = -68.320$ | $d_{13} = 1.9$ | $n_9 = 1.75692$ | $\nu_9 = 31.7$ | | |
| $r_{14} = -123.600$ | $d_{14} = 15.464~7.975$ | | | | |
| $r_{15} = 70.180$ | $d_{15} = 11.0$ | $n_{10} = 1.49782$ | $\nu_{10} = 82.3$ | $L_{41}$ | |
| $r_{16} = -130.821$ | $d_{16} = 10.0$ | | | | |
| $r_{17} = -96.159$ | $d_{17} = 3.0$ | $n_{11} = 1.78797$ | $\nu_{11} = 47.5$ | $L_{42}$ | |
| $r_{18} = -900.350$ | $d_{18} = 0.6$ | | | | |
| $r_{19} = 37.000$ | $d_{19} = 6.5$ | $n_{12} = 1.51680$ | $\nu_{12} = 64.1$ | $L_{43}$ | $G_4$ |
| $r_{20} = 41.623$ | $d_{20} = 66.0$ | | | | |
| $r_{21} = -26.710$ | $d_{21} = 2.5$ | $n_{13} = 1.77279$ | $\nu_{13} = 49.4$ | $L_{44}$ | |
| $r_{22} = -81.538$ | $d_{22} = 0.1$ | | | | |
| $r_{23} = 168.000$ | $d_{23} = 2.0$ | $n_{14} = 1.73350$ | $\nu_{14} = 51.1$ | $L_{45}$ | |
| $r_{24} = 72.000$ | $d_{24} = 6.5$ | $n_{15} = 1.58144$ | $\nu_{15} = 40.8$ | | |
| $r_{25} = -55.442$ | $Bf = 69.828$ | | | | |

| | | First focusing | | Second focusing | |
|---|---|---|---|---|---|
| | | | a | b | c |
| $\Delta D_1/\Delta D_2$ | | $\infty$ | $\infty$ | 1 | 0 |
| fw or $\beta$ | 200.000 | −0.1094 | −0.3057 | −0.2018 | −0.1834 |
| $D_0$ | $\infty$ | 2102.9190 | 928.8761 | 971.3529 | 984.3690 |
| $D_1$ | 73.1132 | 114.3729 | 188.4158 | 130.1559 | 114.3729 |
| $D_2$ | 66.5824 | 66.5824 | 66.5824 | 82.3654 | 85.1324 |
| $D_3$ | −88.6465 | −88.6465 | −88.6465 | −88.6465 | −88.6465 |
| $D_4$ | 220.0000 | 220.0000 | 220.0000 | 220.0000 | 220.0000 |

$f_1 = 274.6520$
$f_2 = -80.2756$
$f_3 = 200.0000$
$f_4 = 220.0000$
$h_\infty = -25.966$
$fw/f_1 = 0.728$
$D_2\gamma/fw = 0.666$
$f_2/r_6 = 0.219$ where $r_1$, $r_2$, $r_3$, ... represent the radii of curvature of the successive lens surfaces, $d_1$, $d_2$, $d_3$, ... represent the center thicknesses and air spaces of the successive lenses, $n_1$, $n_2$, $n_3$, ... represent the refractive indices of the successive lenses, and $\nu_1$, $\nu_2$, $\nu_3$, ... represent the Abbe numbers of the successive lenses.

8. In a zoom lens having, in succession from the object side, a first lens group as a convergent focusing group, a second lens group as a divergent magnification changing group, a third lens group as a convergent correcting group, and a fourth lens group as a convergent relay system, said second group and said third group being movable relative to each other along the optical axis to thereby change the magnification while keeping the image plane at a predetermined position, a focusing method for focusing the zoom lens to objects from infinity to a short distance comprising:

a first focusing step in which said first group is moved along the optical axis toward the object side by a predetermined amount; and a second focusing step in which said first group is moved along the optical axis further toward the object side beyond the predetermined amount in the first focusing step and said second group is also moved along the optical axis toward the object side;

said third group being held stationary relative to an image plane during said first and second focusing steps.

9. The focusing method according to claim 8, wherein said first focusing step includes the step of moving said second group and said third group to a position of the shortest focal length condition of the entire lens system or to a position in the vicinity thereof.

10. The focusing method according to claim 9, wherein in said second focusing step, the following condition is satisfied:

$$-1.0 < \frac{\Delta D_1}{\Delta D_2} < 2.0$$

where $\Delta D_1$ is the amount of the variation in the principal point spacing between said first group and said second group, and $\Delta D_2$ is the amount of variation in the principal point spacing between said second group and said third group.

* * * * *